E. S. NICEWARNER.
LAMINATED TUBE.
APPLICATION FILED APR. 8, 1915.
1,164,304.  Patented Dec. 14, 1915.
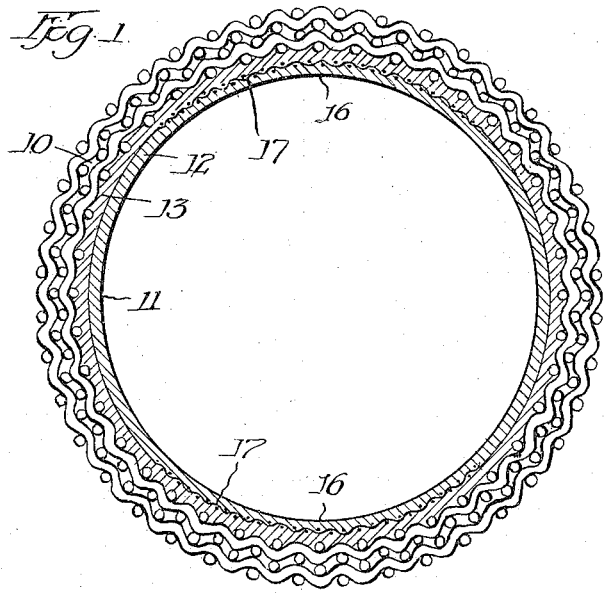
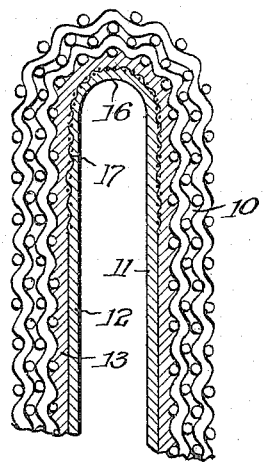
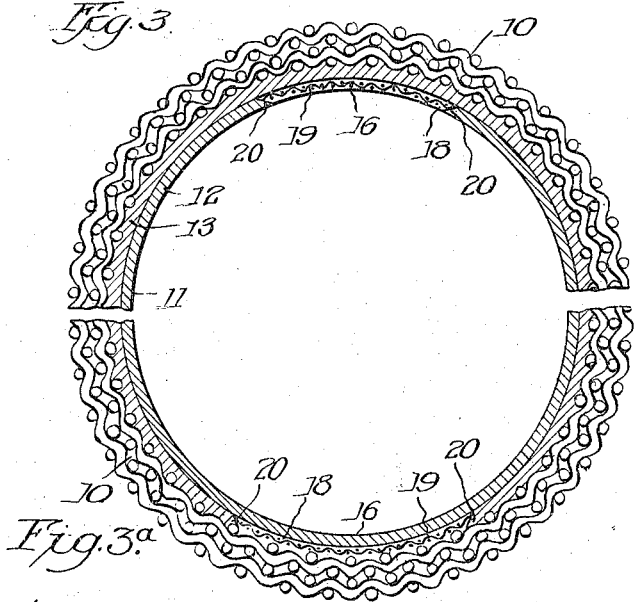
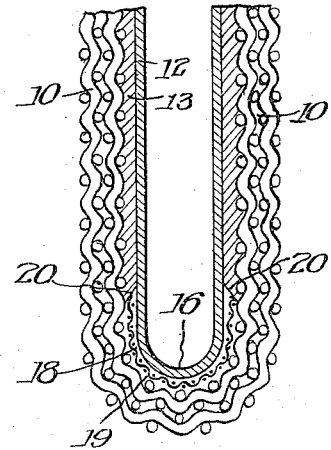
Witnesses:
Inventor:
Edward S. Nicewarner
By attorney

UNITED STATES PATENT OFFICE.

EDWARD S. NICEWARNER, OF CHICAGO, ILLINOIS.

LAMINATED TUBE.

1,164,304.  Specification of Letters Patent.  Patented Dec. 14, 1915.

Application filed April 8, 1915. Serial No. 20,033.

*To all whom it may concern:*

Be it known that I, EDWARD S. NICEWARNER, a citizen of the United States, and a resident of Chicago, in the county of Cook and State of Illinois, have invented certain new and useful Improvements in Laminated Tubes, of which the following is a specification.

My invention relates in general to tubular structures and more particularly to conduit tubes for fluids and has special reference to composite or laminated tubes including an outer portion or shoe and an inner portion or lining.

While tubes embodying my present invention are of a wide range of utility and a number of different structures such as tires, pipes, and the like, may employ my invention to advantage, I find it of particular usefulness in connection with flexible hose and especially that type of hose which is commonly known as fire hose, this article of manufacture being desirable of great flexibility not only laterally in order that it may be carried through tortuous passages, but also longitudinally in order that it may be stored in a small space when not in use, as by winding it upon a reel, weaving it back and forth in a wagon-bed, or hanging it in coils from a rack.

In order that fire hose may occupy the minimum space when not in use, it is commonly manufactured so that it will collapse along predetermined lines upon removal of the internal pressure, thus permitting it to be stored flat. Usually such hose are formed with an outer portion or shoe of non-distensible cotton or linen fabric which gives the necessary mechanical strength and an inner portion of lining of relatively soft rubber for making the hose watertight. Such hose suffer from the defect that the rubber lining in the neighborhood of the fold tends to dry out and set as a result of the great compression of the inner periphery of the lining which squeezes out the natural moisture of the rubber. On inflation or expansion the inner periphery of the rubber at the fold is subjected to great strain, far greater than that on the other parts of the inner periphery of the rubber lining owing to the fact that the rubber lining of the flattened part tends to be compressed (assuming the cover to be inextensible) while the rubber lining of the folded part has to be stretched peripherally two or three times its length when folded. This strain is evidently greatest on the inner periphery of the tube as this is the part where the greatest compression and expansion takes place. As soon therefore as the rubber lining in the neighborhood of the fold becomes dry and "de-natured" a crack inevitably forms from the inside outwardly. This crack deepens every time the tube is expanded after being in the folded condition since the deeper the crack the less the hardened portions of rubber on either side will yield on expansion of the hose. Water entering these fractures, in cases where the rubber lining and the outer coating are united by the adhesive power of the rubber to secure a laminated fabric, tends either to leak through the hose, and to render it impracticably if not substantially impossible to thoroughly dry out the outer coating, with consequent rotting out and eventual rupture of the outer coating and destruction of the hose, or to immediate bursting of the outer coating.

I am aware that it has been proposed to prevent the cracking of structures of the present character by the employment of rubber insets or by thickening the rubber of the lining adjacent the bending points of the hose. Such insets or thickening of the lining however, do not prevent cracking of the lining, and are not included within the scope of my invention, since they are useless for my present purposes, because thickening of the rubber lining at the bending point, whether by increasing the diameter of the sheet of lining material or adding an auxiliary inset tends to aggravate the trouble by increasing the compression along the fold and thereby increasing the required degree of expansion of the inner periphery at that point. The crack tends therefore to develop earlier than in the case of an ordinary tube and once started the crack deepens more readily as the portions adjacent the crack are thicker and therefore tend to yield less readily on expansion of the hose. It has also been proposed to make the lining free from the casing along the line of fold and some distance on either side of the same so that the lining may bend at the fold independently of the casing. This arrangement does not meet the difficulty owing to the fact that the thickness of the rubber lining is not decreased along the line of fold and the radius of curvature of the rubber lining is not decreased by making it free from the casing. Accordingly the rubber on the inner periphery of the tube is required to expand to two or three times its length when compressed by flattening the tube.

The principal objects of the present invention are therefore to provide an improved collapsible tube characterized by the provision of means whereby the strain on the inner periphery of the rubber lining along the fold is reduced to a minimum; the provision of a lining for collapsible tubes characterized by a reduction in the depth of solid rubber extending from the inside of the tube outward along the folded portions of the tube; the provision of a reinforcement located adjacent the inner periphery of the tube and limited in area to the folded portions of the tube and neighboring portions thereof to take the strain of expansion on the rubber lining adjacent the folds while allowing the lining at other parts of the tube to freely expand during the flattening or folding operation; and generally to provide an improved structure of the type set forth at a minimum of cost.

In overcoming certain disadvantages referred to and in attaining the foregoing objects and certain additional benefits and advantages to be below disclosed I have provided the construction illustrated in the accompanying drawings, in which:—

Figure 1 is a transverse sectional view of a fire hose embodying my present improvements in preferred form, the hose being shown in the distended position it assumes when subject to internal pressure before vulcanization; Fig. 2 is a similar view of the same hose, in the position it assumes on collapsing when the internal pressure is removed; Fig. 3 is a transverse sectional view of another embodiment of my improvements, the hose being shown in the distended position; Fig. 3ª is a transverse sectional view of a still further embodiment of my improvements, the hose being shown in the distended position; Fig. 4 is a similar view of the hose shown in Fig. 3ª in the collapsed position.

Referring first to Fig. 1 of the drawing, it will be observed that I have indicated at 10 the outer casing or shoe of the hose, which comprises a suitable tubular fabric, and at 11 the inner coating or lining which is preferably built up of a number of concentric convolutions of rubber, which may be conveniently attained by the employment of a plurality of tubes as is indicated at 12 and 13, such tubes being arranged to be joined together and the structure thus formed to be forced into intimate contact with the member 10 by the well known heat and pressure process of vulcanization not necessary here to describe. After the vulcanizing process the hose is preferably given a form in cross section such as is shown in Fig. 2, which it will at all times assume upon collapsing when the internal pressure of the stream of water is removed, though this form disappears, of course, when the hose is distended by water pressure, since it then assumes the form shown in Fig. 1.

In order to overcome the tendency of the lining 11 to crease and fracture adjacent the bending points indicated at 16—16 (Fig. 2), I insert at or adjacent the inner periphery of the lining 11 longitudinally disposed strips of fabric 17—17, which should extend throughout the entire length of the hose. These strips should preferably be made of relatively thin and tough textile fabric of less thickness than that of the cover 10—12—5—13. The members 17—17 should cover the entire bending points 16—16.

Referring now to Figs. 3 and 4 of the drawings it will be seen that instead of arranging a fabric reinforcement in the body of the rubber lining or on the inner periphery of the same the inner rubber lining is formed with recesses 18 in which are arranged fabric strips 19. These fabric strips may be cemented to the rubber lining 11 or may be loosely laid thereon, in which case they are held in position by means of the lips 20 formed on either side of the recesses 18. The rubber lining is preferably built up of a number of layers of rubber, the inner convolution or convolutions consisting of a complete tube or tubes while the outer convolutions may be formed by applying flat strips of rubber to either side of these tubes. A built-up tube of this nature is more readily formed than a solid integral tube with a recess 18 molded therein.

As in the case of form of hose shown in Figs. 1 and 2 the hose, after the vulcanization process, is preferably given a form in cross section such as is shown in Fig. 4 which it will at all times resume upon collapsing when the internal pressure of the stream of water is removed.

The tendency of the lining 11 to crease and fracture adjacent the bending points 16 is overcome in this form of construction as a result of the thinness of the rubber lining at these points. As the rubber lining is made specially thin at these points there is relatively little change in the peripheral lengths of the outside and inside respectively of the lining when the hose is expanded. This means that the strain placed upon the inner periphery of the lining at the part 16 is relatively slight.

Although the fabric strip 19 is shown in Fig. 4 and Fig. 3ª on the outer side of the lining 11 such an arrangement is not essential as it may equally well be arranged on the inner side of the same as shown in Fig. 3, in which case however, it is necessary that the fabric strip be cemented to the lining 11.

Having thus described my invention and illustrated its use what I claim as new and desire to secure by Letters Patent is:

1. A tubular structure comprising an outer coating, an inner lining of rubber and a longitudinally disposed strip of fabric adapted to limit the depth of solid rubber extending from the inside of the tube outward over the area covered by such strip of fabric.

2. A collapsible tubular structure comprising an outer coating, an inner lining of rubber and longitudinally disposed strips of fabric adjacent the lines of fold of the structure secured to said coating and lining the depth of solid rubber extending from the inside of the tube outward being reduced over the areas covered by such strips of fabric.

3. A collapsible tubular structure comprising an outer substantially inextensible coating, an inner lining of rubber, and longitudinally disposed strips of fabric adjacent the lines of fold of the structure secured to said coating and lining adapted to reduce the depth of solid rubber extending from the inside of the tube outward over the areas covered by such strips of fabric.

4. A tubular structure comprising an outer coating, an inner lining of rubber and oppositely disposed longitudinal fabric reinforcement arranged in recesses in said lining and secured thereto.

5. A tubular structure comprising an outer coating, an inner lining of rubber and oppositely disposed longitudinal fabric reinforcement arranged in recesses in the inner face of said lining.

6. A collapsible tubular structure comprising an outer coating, an inner lining of rubber and oppositely disposed longitudinal fabric reinforcements secured thereto adjacent each line of fold and arranged in recesses in the inner face of said lining.

7. A laminated tube comprising, in combination, a collapsible outer jacket or shoe of woven fabric and an inner tubular lining of rubber, the thickness of said inner tube being decreased adjacent the oppositely disposed lines of fold of said jacket, and supplemental longitudinal reinforcing strips of fabric being inserted between said outer jacket and said inner tube at the said lines of fold.

8. A laminated tube comprising, in combination, a collapsible outer jacket or shoe of woven fabric and an inner tubular lining of rubber, the thickness of said inner tube being decreased adjacent the oppositely disposed lines of fold of said jacket, and supplemental longitudinal reinforcing strips of smooth-faced fabric being inserted between said outer jacket and said inner tube at the said lines of fold.

9. A laminated tube comprising, in combination, a collapsible outer jacket or shoe of woven fabric and an inner tubular lining of rubber, the thickness of said inner tube being decreased adjacent the opposite disposed lines of fold of said jacket, and supplemental longitudinal reinforcing strips of fabric being inserted between said outer jacket and said inner tube at the said lines of fold, said supplemental strips being attached to said inner lining by vulcanization and to said jacket by cement.

10. A tubular structure comprising an outer coating, an inner lining of rubber and a longitudinally disposed strip of fabric adapted to divide said lining over a portion of the surface thereof, whereby the distance said lining may crease along such portions of the surface is limited and the lining can stretch adjacent the other portions of its surface during the collapsing of the tube.

11. A tubular structure comprising an outer coating, an inner lining of rubber and a longitudinally disposed strip of fabric adapted to divide said lining over a portion of the surface thereof, whereby the distance said lining may crease along such portions of the surface is limited.

In testimony whereof I have hereunto signed my name in the presence of the two subscribed witnesses.

EDWARD S. NICEWARNER.

Witnesses:
 RIDSDALE ELLIS,
 DONALD C. WILLIAMS.